Nov. 27, 1934. D. M. WILKS 1,982,364

JOURNAL LUBRICATOR FOR DRIVING BOXES OF A LOCOMOTIVE

Filed July 30, 1932 2 Sheets-Sheet 1

Inventor:
David M. Wilks

Nov. 27, 1934.   D. M. WILKS   1,982,364
JOURNAL LUBRICATOR FOR DRIVING BOXES OF A LOCOMOTIVE
Filed July 30, 1932   2 Sheets-Sheet 2

Inventor:
David M. Wilks

Patented Nov. 27, 1934

1,982,364

UNITED STATES PATENT OFFICE 1,982,364

JOURNAL LUBRICATOR FOR DRIVING-BOXES OF A LOCOMOTIVE

David M. Wilks, Moncton, New Brunswick, Canada

Application July 30, 1932, Serial No. 626,693
In Canada January 28, 1932

10 Claims. (Cl. 308—83)

My invention relates to improvements in a lubricator for lubricating driving-boxes of a locomotive, when running, whereby a constant lubrication of the locomotive journals may be obtained.

Another object of my invention is the provision of a construction, the operation of which will be automatic and result in a constant feeding of the lubricant to the journal, or axle in a uniform manner.

Another object of my invention is to provide a device of as simple construction as possible, to be secured between the lower sides or end of the driving-box and wherein the lubricant applying means is yieldingly maintained in close relation with the axle or journal to be lubricated, and again, wherein ready access may be had to the lubricant-containing chamber or cellar, without the necessity of employing special appliances or tools for the removal of parts. The construction being such that the cellar may be recharged with grease, or removed when necessary without the necessity of removing the entire device from its normal or operative position beneath the journal, or axle and within the journal bearing.

A further object of my invention is to do away with vibration of the several parts, as much as possible, such as the spreader and cellar, thereby causing less wear to the wearing parts, and other parts from breaking, thereby cutting down the cost of repair of the several parts, when the locomotive comes to the shop for repair.

A still further object of my invention is to provide a device of such construction, that the cost of maintenance will be materially reduced over that of constructions as heretofore employed, and whereby the amount of the supply of grease or lubricant will be readily indicated furthermore wherein the possibility for leakage of the grease will be nearly eliminated. The construction possessing other advantages which will be apparent from the following detailed construction.

Figure 2:
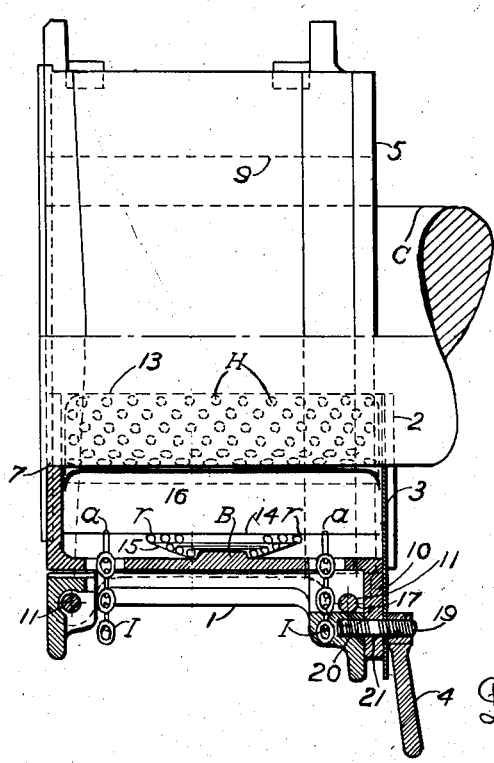
Fig. 2 shows a longitudinal section view of my improved device applied to a journal.
Figure 3:
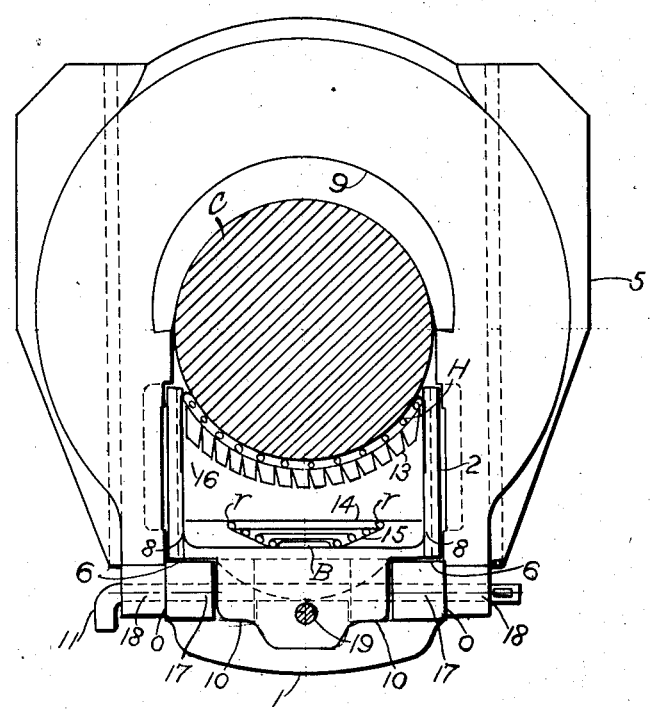

Fig. 3 is end view of my improved device shown on the inside of box with end-plate removed showing perforated plate 13, follower plate 14, the lubricating grease in a cake 16 is placed between the follower-plate 14 and the perforated plate 13, one end of the spring 15 is attached to the follower-plate 14 at R—R, the other end of spring fits over the boss B on the cellar 2 and compresses the grease through the holes H in the perforated-plate 13 to the journal C Fig. 2.

Figure 4:
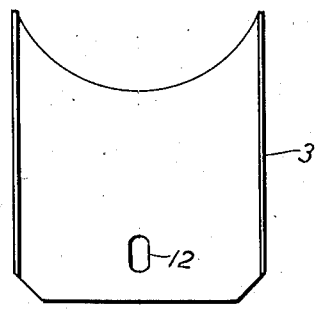

Fig. 4 is a detail view of end-plate 3 Fig. 2.

Figure 5:
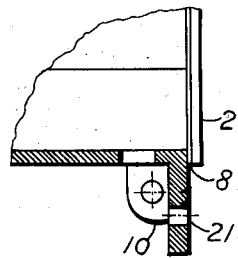

Fig. 5 is a sectional view of the part of cellar showing lug 10.

Figure 6:
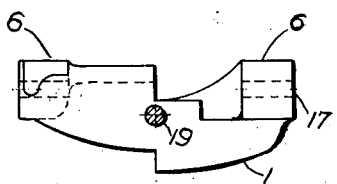

Fig. 6 is end-view of spreader showing half of each end.

Figure 7:
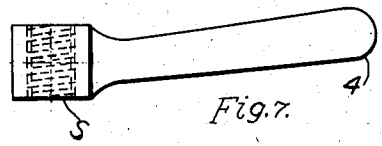

Fig. 7 is a detail elevation of handle 4.

The lubricator consists of a cast-steel spreader 1, a cast-iron cellar 2. End-plate 3 made of steel-plate. Handle 4 made of cast-steel. Perforated plate 13, and follower-plate 14, and grease-cake 16. The indicator chains i—i, which are attached to the follower-plate 14 at a—a shows when the grease is getting low in the cellar 2.

Figure 1:
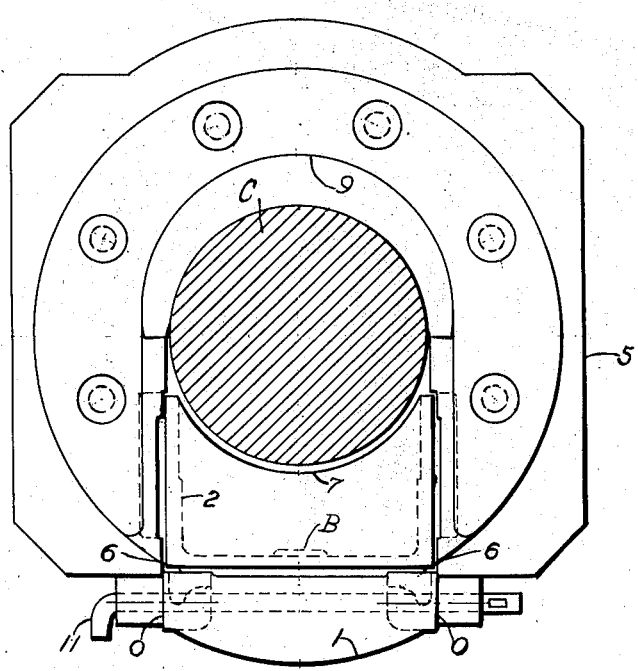
Fig. 1 shows end elevation of driving-box, cellar, and spreader next to hub of wheel.

The spreader 1 holds the driving-box 5 apart at o—o Figs. 1 and 3, not allowing the driving-box 5 to bind on the cellar 2. The cellar is narrower than the spreader 1, thereby allowing the cellar 2 to be easily removed from the driving-box 5, when necessary to pack with grease 16. The spreader 1 protects the cellar 2, allowing it to be of lighter weight than would otherwise be possible if the cellar were used alone.

The spreader 1 Fig. 3 makes a shelf 6—6 upon which the cellar 2 slips in and out, when removing the cellar 2 to pack with grease 16 or for any other reason. The cellar 2 consists of a cast-iron hub-end 7, Fig. 1, and a steel end-plate 3 on the other end, Fig. 2, upon which the axle rests when lifting the engine. The steel end-plate 3 fits in grooves 8—8 Fig. 3 making it easy to adjust as the brass 9, Fig. 3, wears on the journal C. The cellar 2 also has two lugs 10—10, Fig. 3, on its inside end. The pin 11 passes through the holes 18—18 of the driving-box 5, and the holes 17—17 of the spreader 1, and the lugs 10—10 of the cellar 2, Fig. 3, making a compact device, thus doing away with vibration of the several parts, thereby eliminating the wearing of the holes 18—18 in the driving-box 5, and the holes 17—17 in the spreader 1 Fig. 3 as in other devices of a similar construction.

To remove the cellar 2 to pack with grease 16, take off the handle 4, and remove the pin 11, so as to clear the lugs 10—10 of the cellar 2 Fig. 3 and pull the cellar out.

To adjust the end-plate 3 loosen the handle 4, Fig. 2, and shove up on the end-plate 3 which is provided with a slot 12 Fig. 4 which can be lengthened if necessary without much trouble, thus allowing more adjustment.

The grooves 8—8 are set well back from the end of cellar 2, Figs. 3 and 5 making them stronger so as the grooves 8—8 will not break out. The handle 4 Fig. 2 is easily loosened by means of your hand or hammer, not requiring a wrench. A stud 19, Fig. 2, is tapped into the spreader 1 at 20, and passes through a lug on the cellar 2 at 21, Fig. 2, upon which the handle 4 which is tapped at s, Fig. 7, is tightened up fastening the cellar 2 and the spreader 1 together, Fig. 2, making a compact device, doing away with vibration of the several parts. In lieu of a stud a bolt may be passed through the spreader to project similarly to the stud referred to and to pass through the projecting part of the cellar and the end plate to form securing means along with a suitable securing nut or the like.

What I claim as my invention:—

1. Lubricating mechanism for journal boxes comprising a lubricant holder, an end-plate therefor, and a spreader, means on said holder, spreader and journal-box structure for receiving securing means, a common securing member adapted to pass through said receiving means for securing the spreader, holder and journal-box structure together, and means for adjustably securing the end-plate on the holder.

2. Lubricating mechanism for journal-boxes comprising a lubricant holder, an end-plate therefor, and a spreader, means on said holder for receiving a securing member to directly secure the holder and spreader together, and a common securing member designed to extend through said spreader, means on said holder, and the journal-box structure.

3. Lubricating mechanism for journal-boxes comprising a cellar adapted to receive the lubricant, a spreader member, lug means on the cellar, means passing through said lug means and spreader for securing the cellar and spreader together, an end-plate for the cellar designed to slidably fit thereon, means for adjustably securing the end-plate in position, and means for securing the spreader and attached cellar to the journal-box structure.

4. The device as claimed in claim 3, in which the end-plate is formed with a slot and the means for securing the end-plate comprises a pin projecting from the spreader designed to traverse said slot and a member designed to cooperate with said pin to firmly abut and retain said plate in adjusted position.

5. Lubricating mechanism for journal-boxes comprising a lubricant holder, an end-plate therefor and a spreader, a lug formed on said holder having an orifice therein, a pin mounted on said spreader designed to traverse said orifice and to traverse a slot in the end-plate overlying the lug, and a securing member designed to cooperate with said pin to retain the plate relative to the spreader and holder, in rigid adjusted position.

6. The device as claimed in claim 5 in which additional lugs are formed on the box provided with orifices therein designed to register with orifices in the spreader and journal box structure to receive a common securing member.

7. The device as claimed in claim 5 in which the pin is screw threaded and designed to receive a screw threaded securing member formed with an operating handle.

8. Lubricating mechanism for journal boxes comprising a lubricant holder, an end-plate therefor and a spreader, a plurality of means for directly securing the spreader to the holder including a series of orificed lugs one at right angles to the other, one of said lugs receiving therethrough a rigid pin mounted on the spreader, the other lugs receiving therethrough at right angles to the pin a securing member.

9. Lubricating mechanism for journal boxes comprising a lubricant holder, a mounting therefor and an end plate for the holder, means for securing the end plate to the holder, said end plate being adjustable towards and away from the journal, said means also constituting securing means for fastening the holder on its mounting.

10. Lubricating mechanism for journal boxes comprising a lubricant holder, an adjustable end plate therefor and a spreader, means for rigidly securing the spreader to the holder against vertical and horizontal movement, and separate means for securing the spreader to the journal box structure.

DAVID M. WILKS.